United States Patent
Wang et al.

(10) Patent No.: US 11,140,089 B2
(45) Date of Patent: Oct. 5, 2021

(54) DATA WRITING METHOD, SYSTEM, DEVICE AND COMPUTER-READABLE STORAGE MEDIUM

(71) Applicant: Shanghai Bilibili Technology Co., Ltd., Shanghai (CN)

(72) Inventors: Sheng Wang, Shanghai (CN); Quan Zhou, Shanghai (CN); Shangzhi Cai, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 147 days.

(21) Appl. No.: 16/635,000

(22) PCT Filed: Oct. 17, 2019

(86) PCT No.: PCT/CN2019/111682
§ 371 (c)(1),
(2) Date: Jan. 29, 2020

(87) PCT Pub. No.: WO2020/211312
PCT Pub. Date: Oct. 22, 2020

(65) Prior Publication Data
US 2021/0258261 A1    Aug. 19, 2021

(30) Foreign Application Priority Data
Apr. 19, 2019    (CN) .......................... 201910318591.X

(51) Int. Cl.
*H04L 12/835*    (2013.01)
*H04L 12/863*    (2013.01)
(Continued)

(52) U.S. Cl.
CPC ............ *H04L 47/30* (2013.01); *H04L 47/122* (2013.01); *H04L 47/196* (2013.01); *H04L 47/27* (2013.01); *H04L 47/626* (2013.01)

(58) Field of Classification Search
None
See application file for complete search history.

(56) References Cited

U.S. PATENT DOCUMENTS

| 9,432,274 | B1  | 8/2016  | Peon et al. |
| 2017/0353386 | A1* | 12/2017 | Wang ...................... H04L 47/12 |
| 2019/0021065 | A1  | 1/2019  | Zahemszky et al. |

FOREIGN PATENT DOCUMENTS

| CN | 101699795 A | 4/2010 |
| CN | 101771492 A | 7/2010 |

(Continued)

OTHER PUBLICATIONS

International Patent Application No. PCT/CN2019/111682; Int'l Search Report and the Written Opinion; dated Jan. 19, 2020; 10 pages.

*Primary Examiner* — Christine T Duong
(74) *Attorney, Agent, or Firm* — BakerHostetler

(57) ABSTRACT

Embodiments of the present application provide techniques for writing data into a buffer of a protocol stack. The disclosed techniques include determining whether to-be-transmitted data are detected; acquiring a stream control parameter from the protocol stack of a computing device in response to a determination that the to-be transmitted data are detected; and determining whether the to-be-transmitted data are able to be written into the buffer of the protocol stack based on the stream control parameter and a predetermined threshold value, wherein the stream control parameter is associated with a capability of receiving data by a data receiving terminal, and the predetermined threshold value is a predetermined ratio of a size value of an empty area of the buffer of the protocol stack to the stream control parameter.

20 Claims, 12 Drawing Sheets

(51) Int. Cl.
*H04L 12/807* (2013.01)
*H04L 12/801* (2013.01)
*H04L 12/803* (2013.01)

(56) References Cited

FOREIGN PATENT DOCUMENTS

CN 105827537 A 8/2016
CN 109327288 A 2/2019

\* cited by examiner

DATA WRITING METHOD, SYSTEM, DEVICE AND COMPUTER-READABLE STORAGE MEDIUM

CROSS-REFERENCE TO RELATED APPLICATION

The present application is the U.S. National Stage of International Application No. PCT/CN2019/111682, filed on Oct. 17, 2019, which claims priority of Chinese patent application No. 201910318591.X, filed on Apr. 19, 2019. The entire disclosure of the above-identified application is hereby incorporated by reference herein and made a part of this specification.

BACKGROUND

The HyperText Transfer Protocol (HTTP) protocol built on the Transmission Control Protocol (TCP) is a network protocol most widely used in the Internet, especially for transmitting Hypertext Markup Language (HTML) documents from a server to a computer device. However, while the contents of images, video, and other multimedia is increasing, the HTML page's content become much more complex, and make page loading time longer than ever.

SUMMARY

The object of embodiments of the present application is to provide a data writing method, system, device, and computer-readable storage medium, to determinate whether to-be-transmitted data (i.e., data that are to be transmitted from a computing device to a data receiving terminal) are to be written into a protocol stack buffer, thereby avoiding that a computing device writing an excessive to-be-transmitted data into the protocol stack buffer.

One aspect of the embodiments of the present application provides a data writing method, comprising determining whether to-be-transmitted data are detected; acquiring a stream control parameter when the to-be-transmitted data are detected; and controlling a write of the to-be-transmitted data into a protocol stack buffer based on the stream control parameter and a predetermined threshold value, wherein the predetermined threshold value is a predetermined ratio between a size of an empty area of the protocol stack buffer and the stream control parameter.

Preferably, the stream control parameter comprises a congestion window size of a data receiving terminal.

Preferably, the data writing method further comprises obtaining the congestion window size from a protocol stack, wherein the congestion window size is updated, according to a stream data frame from the data receiving terminal, and stored in the protocol stack.

Preferably, the controlling the write of the to-be-transmitted data into a protocol stack buffer based on the stream control parameter and the predetermined threshold value further comprises: determining whether the to-be-transmitted data are able to be written into the protocol stack buffer according to the congestion window size and the predetermined threshold value; wherein, the predetermined threshold value comprises a predetermined ratio between the size of the empty area of the protocol stack buffer and the congestion window size.

Preferably, the determining whether the to-be-transmitted data are able to be written into the protocol stack buffer according to the congestion window size and the predetermined threshold value further comprises: calculating an actual ratio between the size of the empty area and the congestion window size; determining that the to-be-transmitted data are able to be written into the protocol stack buffer when the actual ratio is less than the predetermined threshold value; and determining that the to-be-transmitted data are not able to be written into the protocol stack buffer when the actual ratio is not less than the predetermined threshold value.

Preferably, the determining whether the to-be-transmitted data are able to be written into the protocol stack buffer according to the congestion window size and the predetermined threshold value further comprises: adjusting a current buffer area size of the protocol stack buffer from a first buffer area size to a second buffer area size according to the congestion window size and the predetermined threshold value; and determining whether the to-be-transmitted data are able to be written into the protocol stack buffer according to the second buffer area size.

Preferably, the adjusting the current buffer area size of the protocol stack buffer from the first buffer area size to the second buffer area size according to the congestion window size and the predetermined threshold value further comprises: calculating a product value of the congestion window size and the predetermined threshold value; and adjusting the current buffer area size from the first buffer area size to the second buffer area size, wherein the second buffer area size is equal to or greater than the product value.

Preferably, the determining whether the to-be-transmitted data are able to be written into the protocol stack buffer according to the second buffer area size further comprises: obtaining the size of the empty area of the protocol stack buffer according to the second buffer area size and a size of a non-empty area of the protocol stack buffer, wherein the size of the non-empty area is equal to a size of an area in which data has been stored; comparing the size of the empty area with a data block size of the to-be-transmitted data; when the size of the empty area is greater than the data block size of the to-be-transmitted data, determining that the to-be-transmitted data are able to be written into the protocol stack buffer; and when the size of the empty area is not greater than the data block size of the to-be-transmitted data, determining that the to-be-transmitted data are unable to be written into the protocol stack buffer.

Preferably, the predetermined threshold value ranges from 2 to 5.

Preferably, the protocol stack comprises queues, stacks or Sudoku.

Another aspect of the embodiments of the present application provides a data writing system, wherein the data writing system comprises:

a monitoring module, determining whether to-be-transmitted data are detected;

an obtaining module, acquiring a stream control parameter when the to-be-transmitted data are detected;

a controlling module, controlling a write of the to-be-transmitted data into a protocol stack buffer based on the stream control parameter and a predetermined threshold value, wherein the predetermined threshold value is a predetermined ratio between a size of an empty area of the protocol stack buffer and the stream control parameter.

Another embodiment of the present application provides a computing device, comprising a memory, a processor and computer programs stored in the memory and executed by the processor, wherein the processor executes the computer programs for implementing the steps of the data writing method.

Another embodiment of the present application provides a computer-readable storage medium, storing computer programs executed by at least one processor, to cause the processor to implement the steps of the data writing method.

Another embodiment of the present application provides a data writing method based on a QUIC protocol stack, comprising: receiving a query instruction from an application; and in response to the query instruction, providing a stream control parameter of the QUIC protocol stack to the application so that the application writes to-be-transmitted data into a protocol stack buffer of the QUIC protocol stack according to the stream control parameter and a predetermined threshold value, wherein the predetermined threshold value is a predetermined ratio between a size of an empty area of the protocol stack buffer and the stream control parameter.

Preferably, the stream control parameter comprises a congestion window size of a data receiving terminal.

Preferably, the data writing method based on the QUIC protocol stack further comprises: receiving a stream data frame from the data receiving terminal; and updating the congestion window size according to the stream data frame, and storing the updated congestion window size in the QUIC protocol stack.

Yet another aspect of the embodiments of the present application provides a data writing method based on a QUIC protocol stack, comprising:

receiving a query instruction from an application;

in response to the query instruction, providing a stream control parameter in the QUIC protocol stack to the application;

receiving a buffer adjustment instruction from the application, wherein the buffer adjustment instruction is used to adjust a current buffer area size of the QUIC protocol stack from a first buffer area size to a second buffer area size, the second buffer area size is calculated based on the stream control parameter and a predetermined threshold value, wherein the predetermined threshold value is a predetermined ratio between a size of an empty area of a protocol stack buffer and the stream control parameter; and in response to the buffer adjustment instruction, adjusting the current buffer area size from the first buffer area size to the second buffer area size, so that the application writes to-be-transmitted data into the protocol stack buffer according to the second buffer area size.

Preferably, the stream control parameter comprises a congestion window size of a data receiving terminal.

Preferably, the second buffer area size is equal to or greater than a product value, the product value is calculated by multiplying the congestion window size by the predetermined threshold value.

Preferably, the data writing method based on the QUIC protocol stack further comprises: providing a size of a non-empty area of the protocol stack buffer to the application, so that the application determines whether the to-be-transmitted data are able to be written into the protocol stack buffer according to the second buffer area size, the size of the non-empty area and a data block size of the to-be-transmitted data.

Preferably, the data writing method based on the QUIC protocol stack further comprises: receiving a confirmation from the data receiving terminal; and deleting to-be-transmitted data corresponding to the confirmation in the protocol stack buffer and updating the size of the non-empty area.

Preferably, the protocol stack comprises queues, stacks or Sudoku.

Yet another aspect of the embodiments of the present application provides a data writing system based on a QUIC protocol stack, comprising:

a first receiving module, receiving a query instruction from an application;

a first response module, providing a stream control parameter in the QUIC protocol stack to the application in response to the query instruction;

a second receiving module, receiving a buffer adjustment instruction from the application, wherein the buffer adjustment instruction is used to adjust a current buffer area size of the QUIC protocol stack from a first buffer area size to a second buffer area size, the second buffer area size is calculated based on the stream control parameter and a predetermined threshold value, wherein the predetermined threshold value is a predetermined ratio between a size of an empty area of a protocol stack buffer and the stream control parameter;

a second response module, in response to the buffer adjustment instruction, adjusting the current buffer area size from the first buffer area size to the second buffer area size, so that the application writes to-be-transmitted data into the protocol stack buffer according to the second buffer area size.

Yet another aspect of the embodiments of the present application provides a computing device comprising a memory, a processor, and computer program stored on the memory and executable on the processor, wherein the processor executes the computer programs for implementing the steps of the data writing method based on the QUIC protocol stack.

Yet another aspect of the embodiments of the present application provides a computer-readable storage medium, storing computer programs executed by at least one processor, to cause the processor to implement the steps of the data writing method based on the QUIC protocol stack.

The data writing method, system, computing device, and computer-readable storage medium provided by the embodiments of the present application determines whether to-be-transmitted data can be written into a protocol stack buffer according to a stream control parameter and a predetermined threshold value, thereby determining whether the to-be-transmitted data are to be written into the protocol stack buffer, and avoiding writing excessive to-be-transmitted data into the protocol stack buffer, which can help to reduce memory and CPU workload.

DETAILED DESCRIPTION OF ILLUSTRATIVE EMBODIMENTS

To make the objectives, technical solutions and advantages of the present application more comprehensible, the present application is described in further detail below with reference to embodiments and the accompanying drawings. It should be understood that, the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Figure 1:
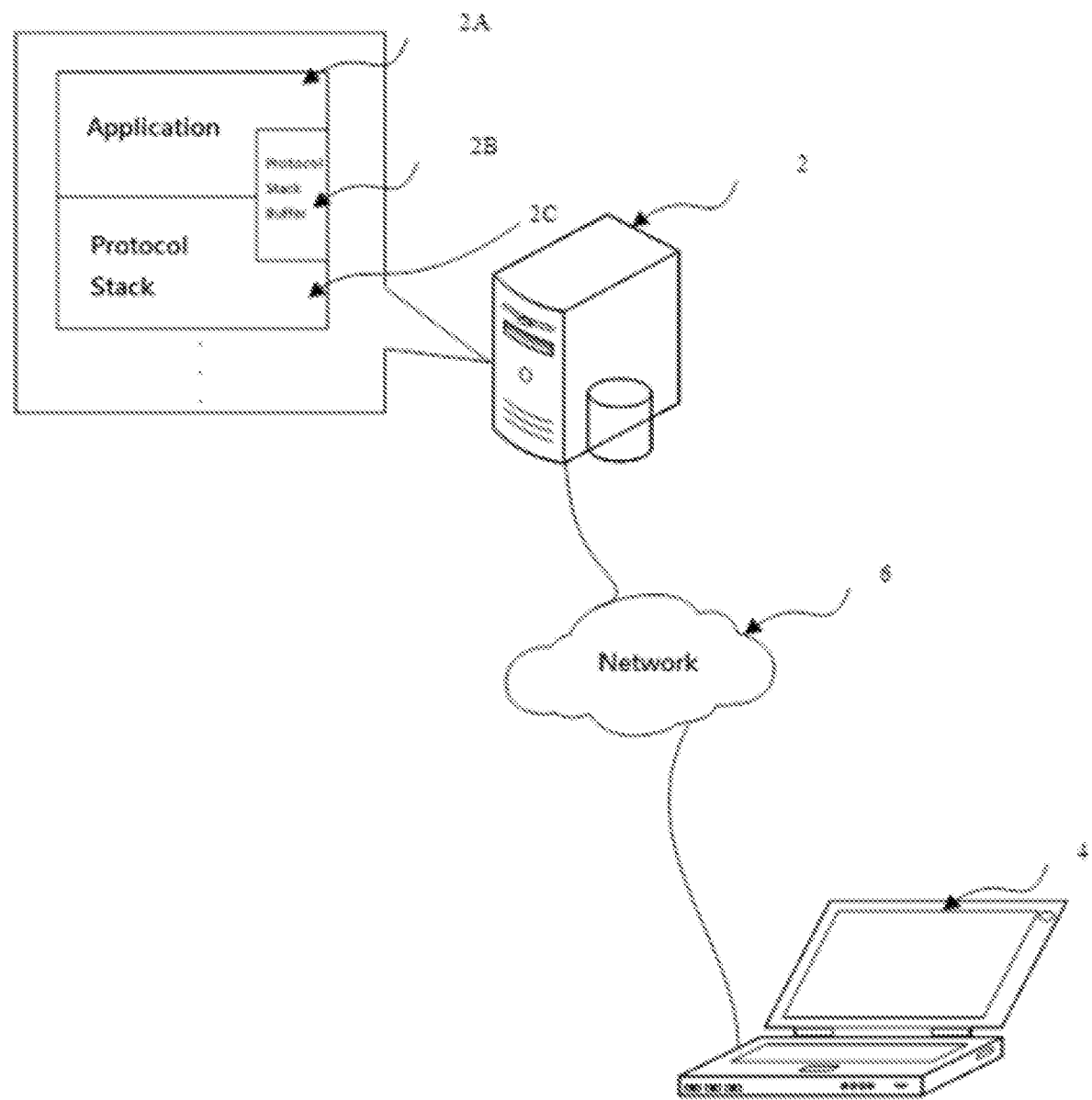
FIG. 1 is a schematic diagram of a data writing method according to a first embodiment of the present application.

FIG. 1 is a schematic diagram of a data writing method according to a first embodiment of the present application. In an exemplary embodiment, a computing device 2 (as a data transmitting terminal) transmits data to a data receiving terminal through a network 6. The computing device 2 may be an electronic device having a data transmission function such as a server, a mobile phone, a tablet personal computer, a laptop computer, or the like. The data receiving terminal 4 may be an electronic device having a data receiving function such as a server, a set-top box, a mobile phone, a tablet personal computer, a laptop computer, a smart TV, or the like. The network 6 may be the Internet.

Embodiment 1

Figure 2:
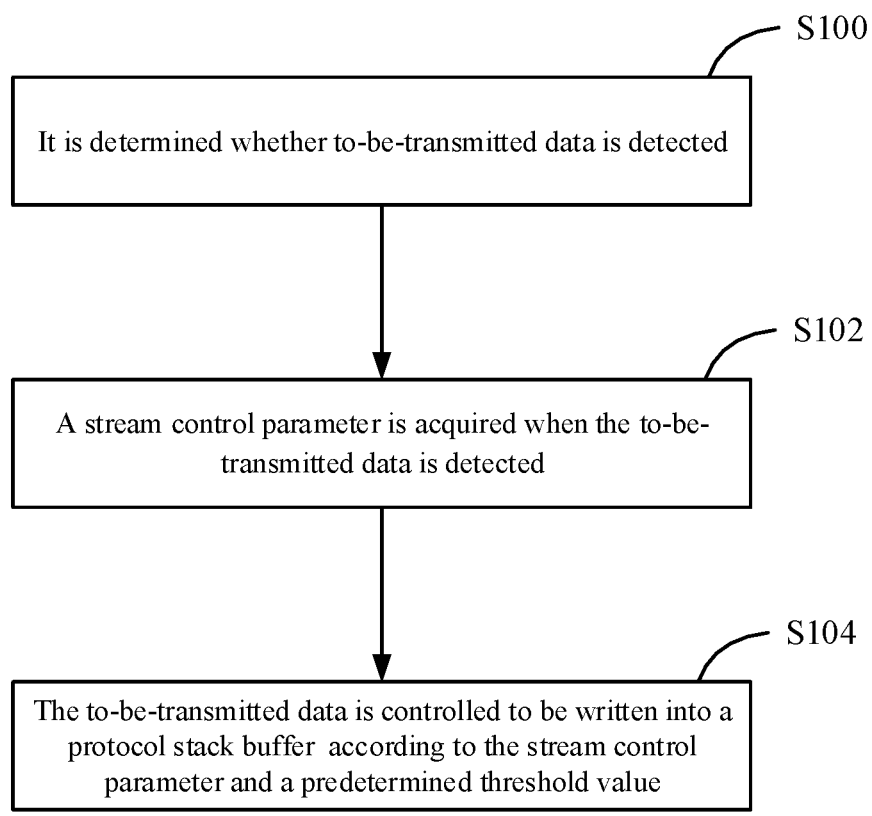
FIG. 2 is a flowchart of a data writing method according to a first embodiment of the present application.

FIG. 2 is a flowchart of a data writing method according to a first embodiment of the present application. It should be understood that the flowchart in the embodiment of the method is not intended to limit the order of the steps. The method is exemplarily described below using a computing device 2 as an executive body.

As shown in FIG. 2, the data writing method may include steps S100-S108, wherein:

Step S100, it is determined whether to-be-transmitted data are detected.

Exemplary, it is monitored whether the application 2A generates to-be-transmitted data, the to-be-transmitted data may be a request packet or response packet, and the to-be-transmitted data can be used to carry video, audio, text, images and other data content.

Exemplary, the application 2A may be an application (e.g., a web browser application) based on an application layer protocol such as HTTP, HTTPS (HyperText Transfer Protocol Secure), FTP (File Transfer Protocol), SMTP (Simple Mail Transfer Protocol), TELNET protocol, or the like.

Step S102, a stream control parameter is acquired when the to-be-transmitted data are detected.

The stream control parameter is associated with data reception capability of a data receiving terminal 4.

The stream control parameter may include a congestion window size associated with the data receiving terminal 4.

In an exemplary embodiment, when the computing device 2 communicates with the data receiving terminal 4 based on the Quick UDP Internet Connections (QUIC) protocol, the congestion window size is updated, based on a stream data frame from the data receiving terminal 4, and stored in a protocol stack 2C. The QUIC is an UDP-based Internet transport layer protocol which provides many advantages, such as reducing connection latency, avoiding head-of-line blocking, supporting multiplexing, etc. The stream data frame may be a MAX_STREAM_DATA frame, which is used in the flow control of the QUIC protocol for notifying the data transmitting terminal (i.e., the computing device 2) the maximum amount of data that can be sent on an identified stream. The stream data frame includes a stream identification number (stream ID) and maximum stream data. Some embodiments of the present disclosure provide a data writing method that enables a data transmission terminal to determine whether to-be-transmitted data are able to be written into a protocol stack buffer under the flow control of the QUIC protocol.

In an exemplary embodiment, when the computing device 2 communicates with the data receiving terminal 4 based on the UDP protocol, the congestion window size is updated, based on a WINDOW_UPDATE frame from the data receiving terminal 4, and stored in the protocol stack 2C.

The WINDOW_UPDATE frame, also known as a window update frame, is used in the flow control of the UDP protocol.

Step S104, the to-be-transmitted data are controlled to be written into a protocol stack buffer 2B according to the stream control parameter and a predetermined threshold value. The predetermined threshold value is a predetermined ratio of a size of an empty area of the protocol stack buffer 2B to the stream control parameter.

The to-be-transmitted data are controlled to be written into the protocol stack buffer 2B, including the following.

(1) The to-be-transmitted data are written into the protocol stack buffer 2B.

The protocol stack buffer 2B may be a queue, a stack or Sudoku. The queue may be a FIFO (First Input First Output) queue, a circular queue, or the like.

The to-be-transmitted data, for example, may be copied into the FIFO queue in order or by priority. The to-be-transmitted data in the FIFIO queue may be popped from the FIFO queue by the protocol stack 2C and packaged into one or more packets, such as QUIC packets and TCP packets, which are sent to the data receiving terminal 4.

(2) The to-be-transmitted data are limited to be written into the protocol stack buffer 2B.

In an exemplary embodiment, when the stream control parameter is the congestion window size, the step S104 further includes: determining whether the to-be-transmitted data are able to be written into the protocol stack buffer 2B according to the congestion window size and the predetermined threshold value. The predetermined threshold value comprises a predetermined ratio of the size of the empty area of the protocol stack buffer 2B to the congestion window size. The predetermined ratio is between (including the endpoint) 2~5 (including the endpoint), preferably, 2, 2.5, 3, 3.5, 4, 4.5 and 5.

Figure 3:
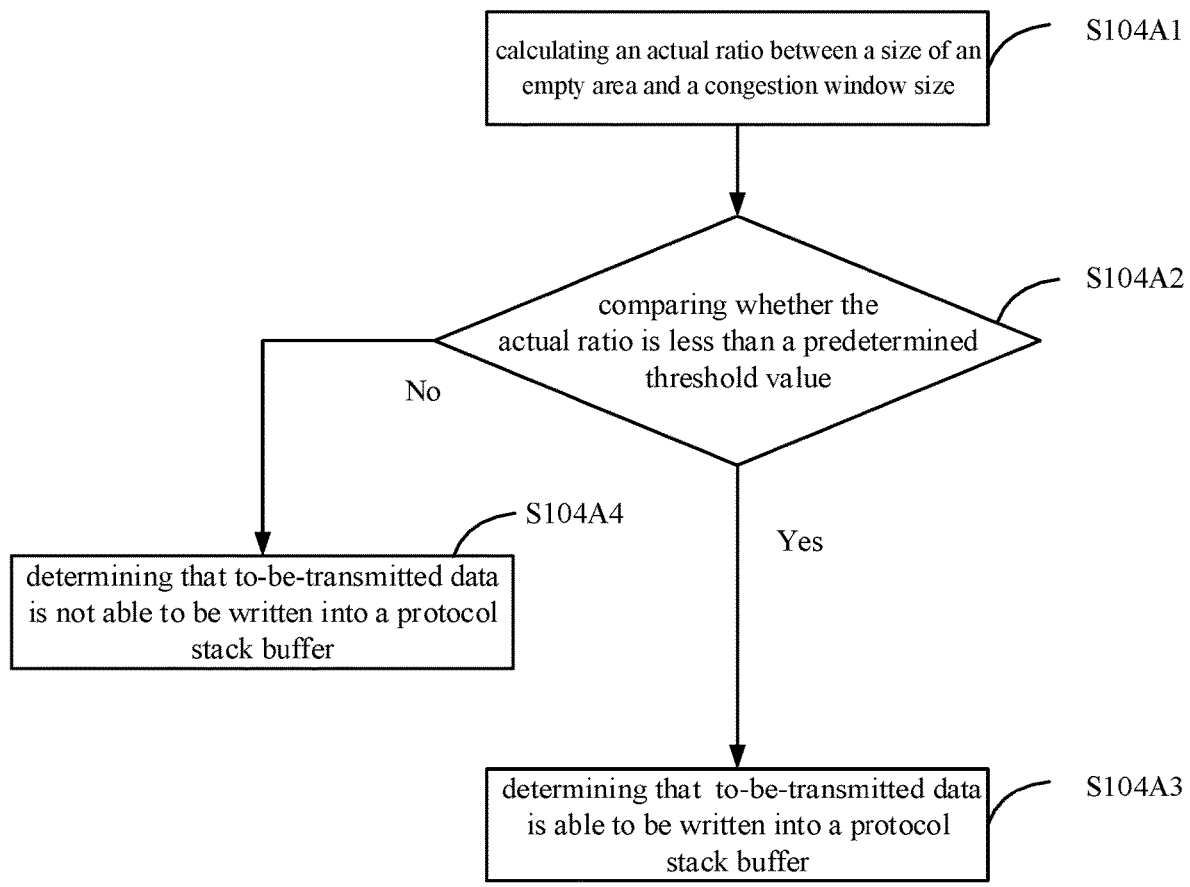
FIG. 3 is a detailed flowchart of the step 104 shown in FIG. 2.

In an exemplary embodiment, as shown in FIG. 3, it is determined whether the to-be-transmitted data are able to be written into the protocol stack buffer 2B according to the congestion window size and the predetermined threshold value, further including: S104A1, calculating an actual ratio of the size of the empty area to the congestion window size; S104A2, comparing whether the actual ratio is less than the predetermined threshold value; if yes, the method goes to step S104A3; if no, the method goes to step S104A4; S104A3, determining that the to-be-transmitted data are able to be written into the protocol stack buffer 2B; S104A4, determining that the to-be-transmitted data are not able to be written into the protocol stack buffer 2B.

Figure 4:
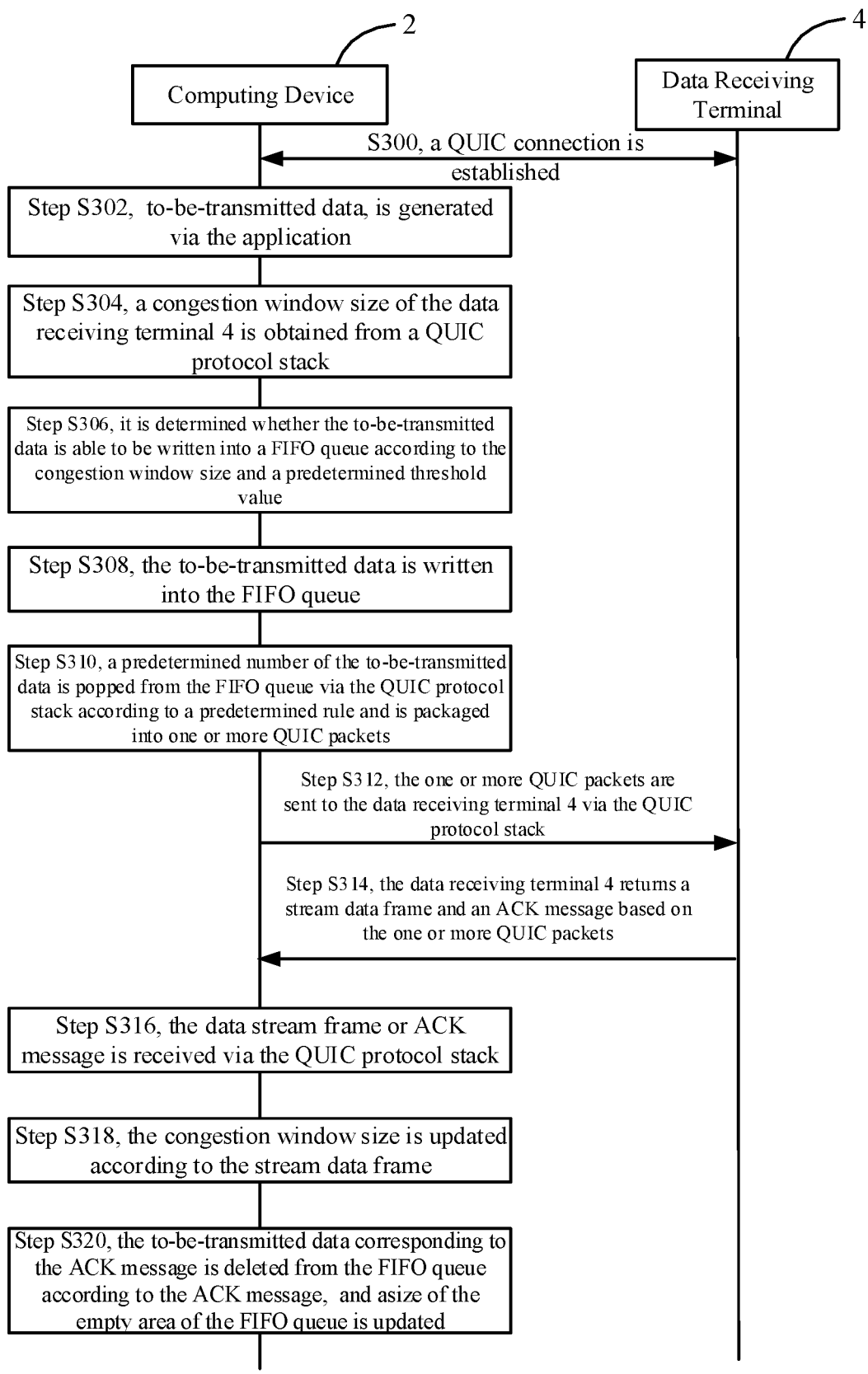
FIG. 4 is a flowchart of the data writing method in one using scene according to the first embodiment of the present application.

FIG. 4 is a flowchart of the first embodiment of the data writing method used in a scene which includes the computing device 2 and the data receiving terminal 4. An application of the application layer and a QUIC protocol stack at the transport layer are installed in the computing device 2. The application is configured to receive message data or generate and send message data (e.g. an HTTP response message). Details are described as follows.

Step S300, a QUIC connection between the computing device 2 and the data receiving terminal 4 is established, and message data are sent to the data receiving terminal 4 based on the QUIC connection.

Step S302, new message data, the to-be-transmitted data, is generated via the application.

Step S304, a congestion window size of the data receiving terminal 4 is obtained from the QUIC protocol stack.

The congestion window size is updated, according to stream data frames from the data receiving terminal, and stored in the QUIC protocol stack.

Step S306, it is determined whether the to-be-transmitted data are able to be written into the FIFO queue according to the congestion window size and the predetermined threshold value; if yes, the process goes to step S308; and if not, the process goes to step S304.

The predetermined threshold value is a predetermined ratio of a size of an empty area of the FIFO queue to the congestion window size. The predetermined ratio is between (including the endpoint) 2~5 (including the endpoint), preferably, 2, 2.5, 3, 3.5, 4, 4.5 and 5.

Step S308, the to-be-transmitted data are written into the FIFO queue.

Step S310, a predetermined number of the to-be-transmitted data are popped from the FIFO queue via the QUIC protocol stack according to a predetermined rule and is packaged into one or more QUIC packets.

Exemplary, the to-be-transmitted data of 1 KB was popped from a head of the FIFO queue and is packaged into QUIC data packages, then the QUIC data packages are sent to the data receiving terminal 4 via a UDP Socket.

Step S312, the one or more QUIC packets are sent to the data receiving terminal 4 via the QUIC protocol stack.

Step S314, the data receiving terminal 4 returns a stream data frame and an ACK message based on the one or more QUIC packets.

It is noted that the stream data frame and ACK message may be synchronously or asynchronously transmitted. The stream data frames are not necessarily transmitted based on a determination that whether the QUIC packet is received from the computing device 2.

Step S316, the data stream frame or ACK message is received via the QUIC protocol stack.

Step S318, the congestion window size is updated according to the stream data frame.

Step S320, the to-be-transmitted data corresponding to the ACK message is deleted from the FIFO queue according to the ACK message, and the size of the empty area of the FIFO queue is updated.

It can be seen that the first embodiment of the data writing method determines whether the to-be-transmitted data can be written into the protocol stack buffer according to the stream control parameter and the predetermined threshold value, thereby determining whether the to-be-transmitted data are to be written into the protocol stack buffer, and avoiding that the computing device 2 writes excessive to-be-transmitted data into the protocol stack buffer, which reduces memory load and machine pressure.

Embodiment 2

Figure 5:
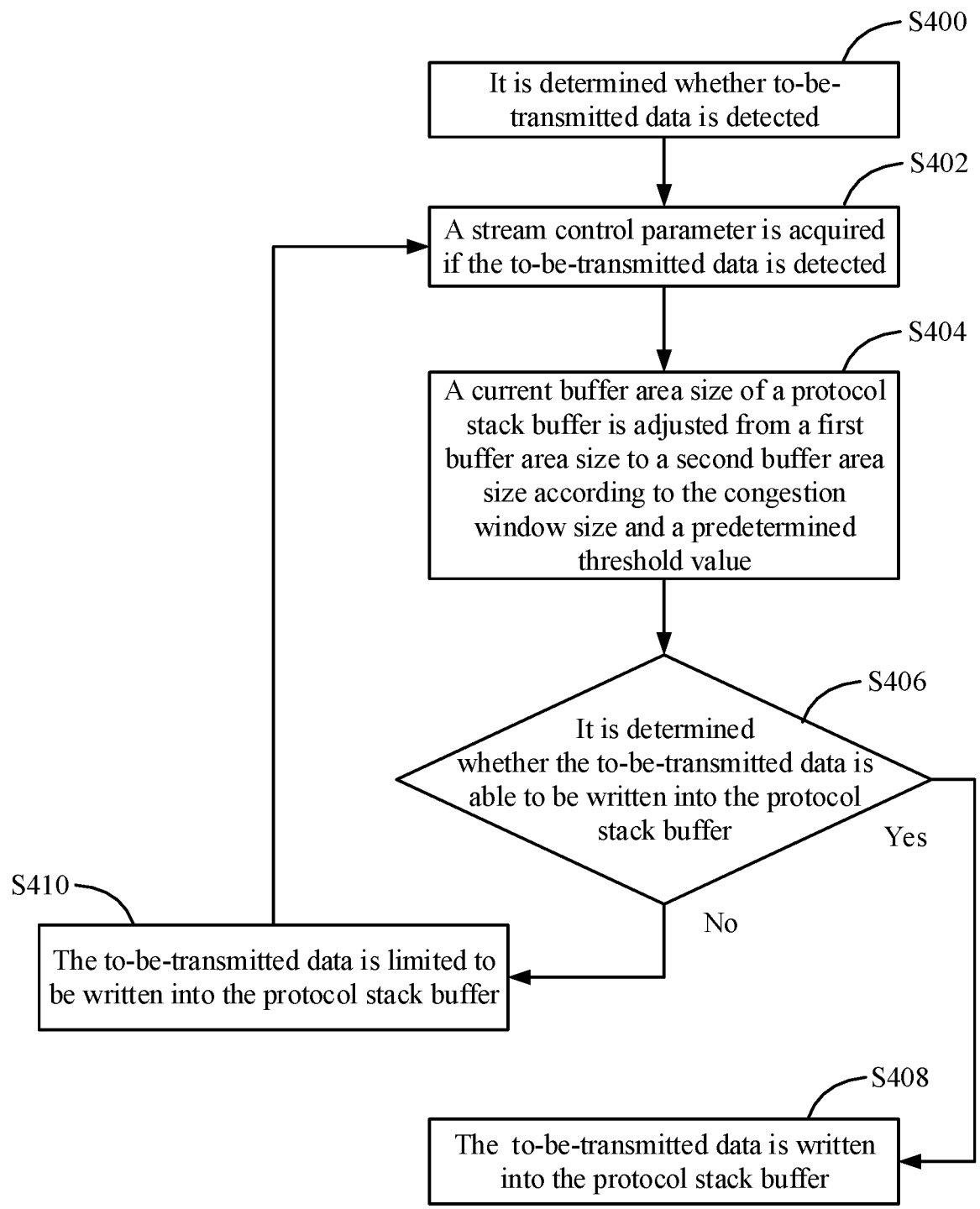
FIG. 5 is a flowchart of a data writing method according to a second embodiment of the present application.

FIG. 5 is a flowchart of a data writing method according to a second embodiment of the present application. The data writing method may include steps S400 to S410.

Step S400, it is determined whether to-be-transmitted data are detected.

Specifically, it is monitored whether the application generates to-be-transmitted data, the to-be-transmitted data may be a request packet or response packet. The application 2A may be an application (e.g., a web browser application) based on an application layer protocol such as HTTP, HTTPS, FTP, SMTP, TELNET protocol, or the like.

Step S402, a stream control parameter is acquired when the to-be-transmitted data are detected.

In an exemplary embodiment, the stream control parameter may include a congestion window size of a data receiving terminal 4.

In an exemplary embodiment, when the computing device 2 communicates with the data receiving terminal 4 based on the QUIC protocol, the congestion window size is updated, based on a stream data frame from the data receiving terminal 4, and stored in a protocol stack.

In an exemplary embodiment, when the computing device 2 communicates with the data receiving terminal 4 based on the UDP protocol, the congestion window size is updated, based on a WINDOW_UPDATE frame from the data receiving terminal 4, and stored in the protocol stack 2C.

Step S404, a current buffer area size (Max Buffer Size) of a protocol stack buffer is adjusted from a first buffer area size to a second buffer area size according to the congestion window size and a predetermined threshold value.

In an exemplary embodiment, the predetermined threshold value is a predetermined ratio of a size of an empty area of the protocol stack buffer to the congestion window size. The predetermined ratio is between 2 and 5 (including the endpoints), preferably: 2, 2.5, 3, 3.5, 4, 4.5 and 5.

Figure 6:
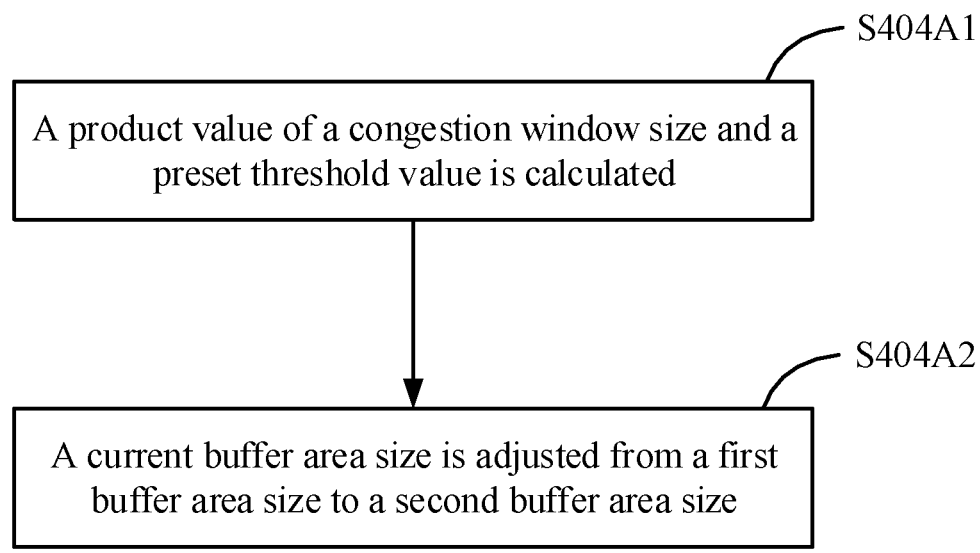
FIG. 6 is a detailed flowchart of the step S404 shown in FIG. 5.

In an exemplary embodiment, as shown in FIG. 6, the step S404 may comprise the following steps. Step S404A1, a product value of the congestion window size and the predetermined threshold value is calculated. Step S404A2, the current buffer area size is adjusted from the first buffer area size to the second buffer area size. The second buffer area size is equal to or about greater than the product value. The "about greater than" criterion can be determined based on fault tolerance criteria. The first buffer area size may be greater than, equal to or smaller than the second buffer area size.

Step S406, it is determined whether the to-be-transmitted data are able to be written into the protocol stack buffer according to the second buffer area size; and if yes, the process proceeds to step S408; and if no, the process proceeds to step S410.

Figure 7:
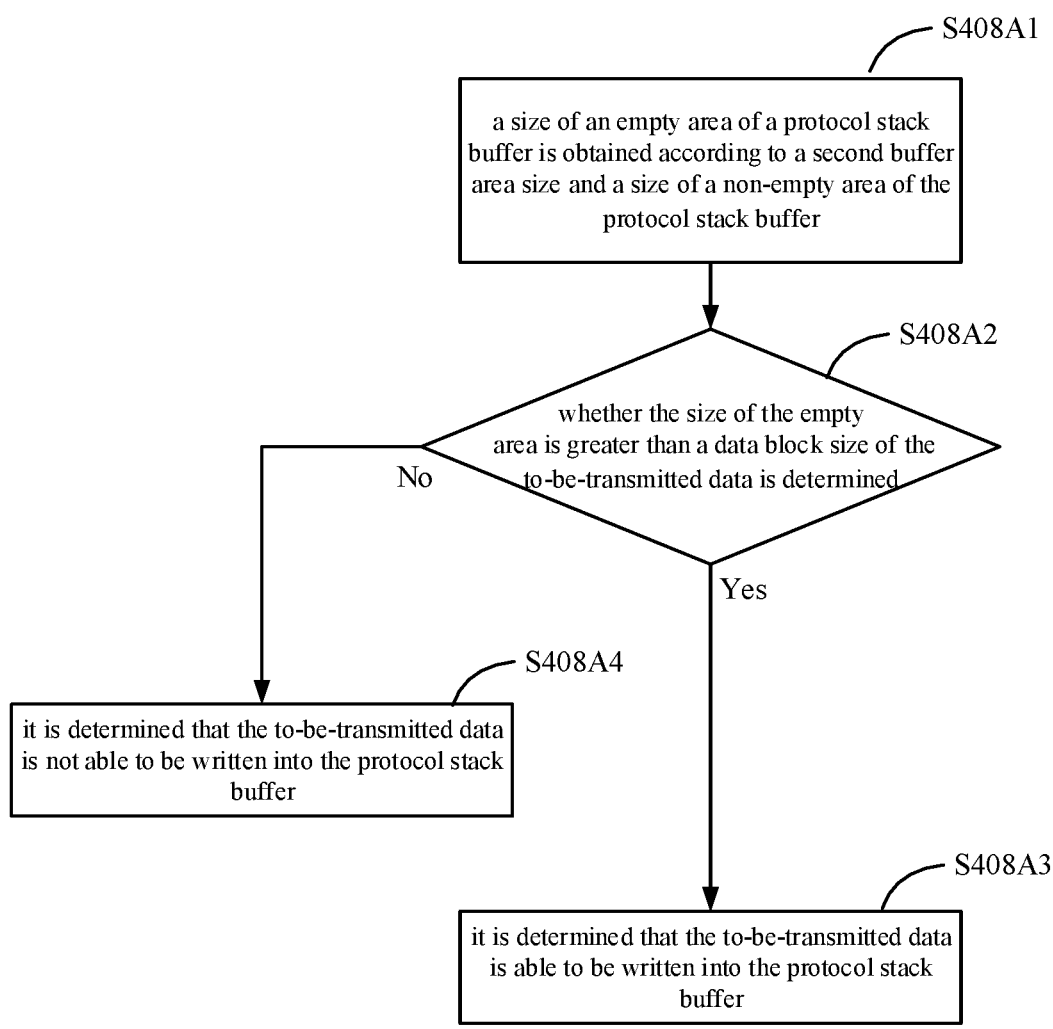
FIG. 7 is a detailed flowchart of the step S408 shown in FIG. 5.

In an exemplary embodiment, as shown in FIG. 7, the step S408 may comprise the following steps. Step S408A1, the size of the empty area of the protocol stack buffer is obtained according to the second buffer area size and a size of a non-empty area of the protocol stack buffer. Wherein, the size of the empty area is equal to a size of an area in which data has been stored, the size of the non-empty area is equal to a size of an area in the protocol stack buffer where no data are stored.

Step S408A2, whether the size of the empty area is greater than a data block size of the to-be-transmitted data are determined; if yes, the process proceeds to step S408A3; and if no, the process proceeds to step S408A4. Step S408A3, it is determined that the to-be-transmitted data are able to be written into the protocol stack buffer. Step S408A4, it is determined that the to-be-transmitted data are unable to be written into the protocol stack buffer.

Step S408, the to-be-transmitted data are written into the protocol stack buffer.

The protocol stack buffer may be a queue, a stack, or Sudoku. The queue may be a FIFO (First Input First Output) queue, a circular queue, or the like.

Step S410, the to-be-transmitted data are limited to be written into the protocol stack buffer, and the steps S402-S406 are repeatedly performed at a predetermined frequency until the process proceeds to step S408.

Figure 8:
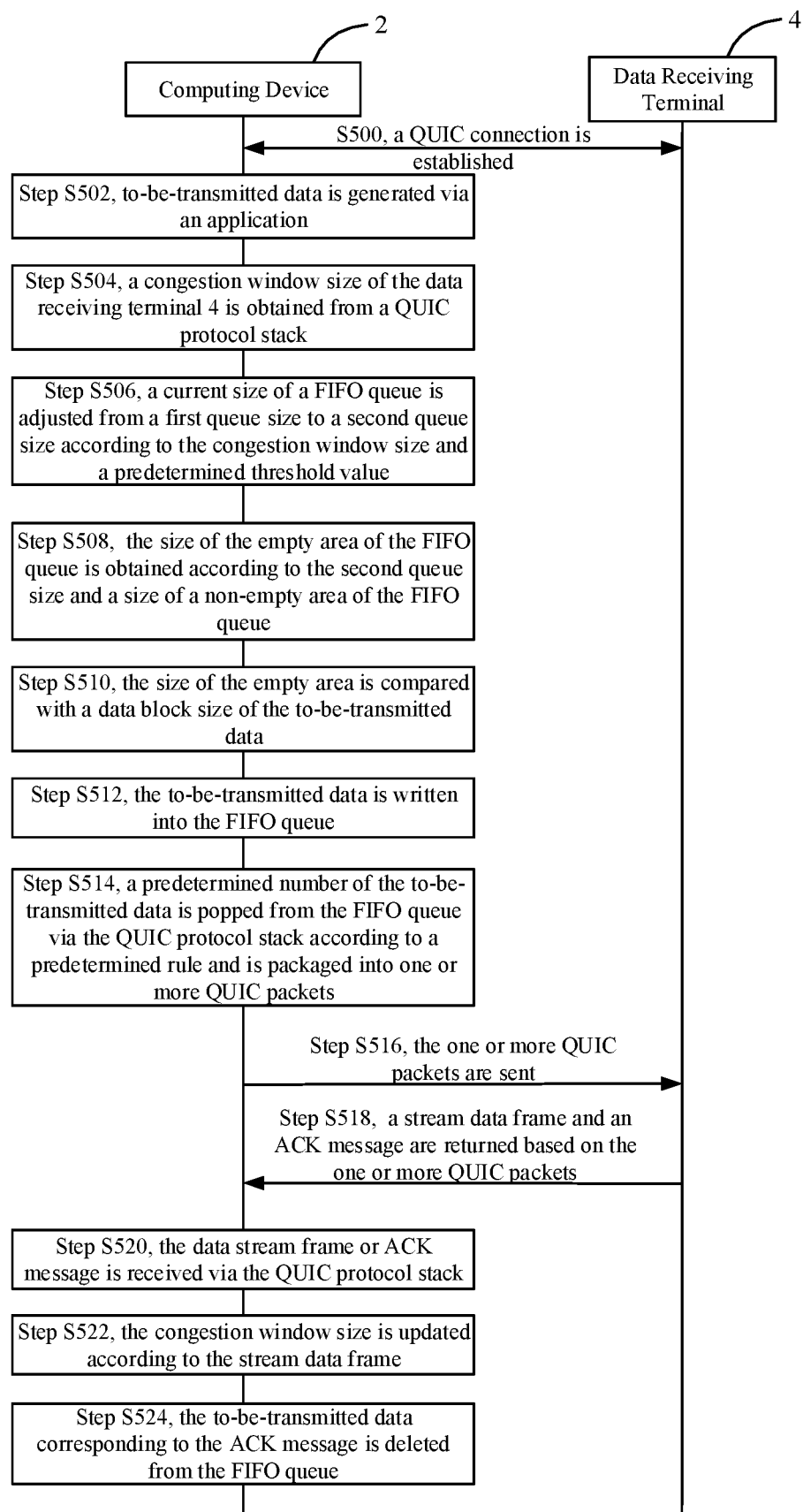
FIG. 8 is a flowchart of the data writing method in one using scene according to the second embodiment of the present application.

FIG. 8 is a flowchart of the second embodiment of the data writing method used in a scene which includes the computing device 2 and the data receiving terminal 4. An application of the application layer and a QUIC protocol stack at the transport layer are installed in the computing device 2. The application is configured to receive message data or generate and send message data (e.g. an HTTP response message). Details are described as follows.

Step S500, a QUIC connection between the computing device 2 and the data receiving terminal 4 is established, and the message data are sent to the data receiving terminal 4 based on the QUIC connection.

Step S502, new message data, the to-be-transmitted data, is generated via the application.

Step S504, a congestion window size of the data receiving terminal 4 is obtained from the QUIC protocol stack.

Step S506, a current size of a FIFO queue is adjusted from a first queue size to a second queue size according to the congestion window size and a predetermined threshold value.

The second queue size is equal to a product value of the congestion window size and the predetermined threshold value. The predetermined threshold value is a predetermined ratio of a size of an empty area of the FIFO queue to the congestion window size. The predetermined ratio is between (including the endpoint) 2~5 (including the endpoint), preferably, 2, 2.5, 3, 3.5, 4, 4.5 and 5.

Step S508, the size of the empty area of the FIFO queue is obtained according to the second queue size and a size of a non-empty area of the FIFO queue.

Step S510, the size of the empty area is compared with a data block size of the to-be-transmitted data. When the size of the empty area is greater than the data block size of the to-be-transmitted data, the process proceeds to step S512; and if not, the process proceeds to step S504.

Step S512, the to-be-transmitted data are written into the FIFO queue.

Step S514, a predetermined number of the to-be-transmitted data are popped from the FIFO queue via the QUIC protocol stack according to a predetermined rule and is packaged into one or more QUIC packets.

Step S516, the one or more QUIC packets are sent to the data receiving terminal 4 via the QUIC protocol stack.

Step S518, the data receiving terminal 4 returns a stream data frame and an ACK message based on the one or more QUIC packets.

Step S520, the data stream frame or ACK message is received via the QUIC protocol stack.

Step S522, the congestion window size is updated according to the stream data frame.

Step S524, the to-be-transmitted data corresponding to the ACK message is deleted from the FIFO queue according to the ACK message, and the size of the empty area of the FIFO queue is updated.

It can be seen that the second embodiment of the data writing method dynamically adjusts the current buffer area size of the protocol stack buffer, thereby avoiding the following problems: a problem of inaccurate flow control caused by the protocol stack buffer being too small, and a problem of resource waste caused by the protocol stack buffer being too large. Particularly, since the protocol stack buffer is too large, the to-be-transmitted data stays in the protocol stack buffer with a long time due to the flow control, resulting in memory resource waste and machine overload.

Embodiment 3

Figure 9:
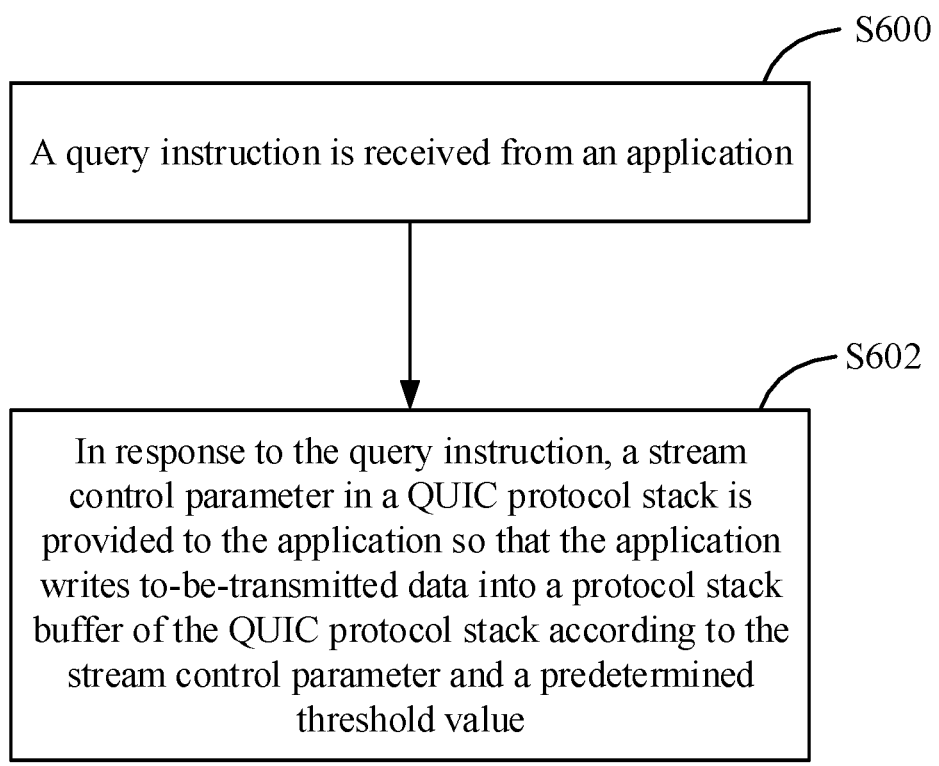
FIG. 9 is a flowchart of a data writing method according to a third embodiment of the present application.

FIG. 9 is a flowchart of a data writing method according to a third embodiment of the present application. The data writing method may include steps S600 to S602.

Step S600, a query instruction is received from an application.

The application is located in the application layer. The query instruction is an instruction that the application calls a specified an API of the transport layer, and is configured to request the transport layer to feedback a specified stream control parameter to the application.

Specifically:

When the application in the application layer generates to-be-transmitted data, the to-be-transmitted data has to be written into a protocol stack buffer. The to-be-transmitted data are retrieved from the protocol stack buffer via the protocol stack of the transport layer and is packaged as one or more data packets (e.g. TCP data packets, QUIC packets, etc.), and the one or more data packets are sent to the data receiving terminal.

When the application in the application layer generates the to-be-transmitted data, it is necessary to determine whether the to-be-transmitted data can be written into the protocol stack buffer at the current time node. When it is determined that the to-be-transmitted data cannot be written into the protocol stack buffer at the current time node, the to-be-transmitted data are limited to be written into the protocol stack buffer.

The determining step depends on a stream control parameter and a predetermined threshold value.

The stream control parameter is stored in the transport layer. The stream control parameter is a parameter from the receiving terminal, such as a congestion window size.

In an exemplary embodiment, when the computing device 2 communicates with the data receiving terminal 4 based on the QUIC protocol, the congestion window size may be updated by the stream data frame fed back by the data receiving terminal 4.

In an exemplary embodiment, when the computing device 2 communicates with the data receiving terminal 4 based on the UDP protocol, the congestion window size may be updated by the WINDOW_UPDATE frame fed back by the data receiving terminal 4.

Step S602, in response to the query instruction, the stream control parameter in the QUIC protocol stack is provided to the application so that the application writes the to-be-transmitted data into the protocol stack buffer of the QUIC protocol stack according to the stream control parameter and the predetermined threshold value.

The predetermined threshold value is a predetermined ratio of a size of an empty area of the protocol stack buffer to the stream control parameter.

Embodiment 4

Figure 10:
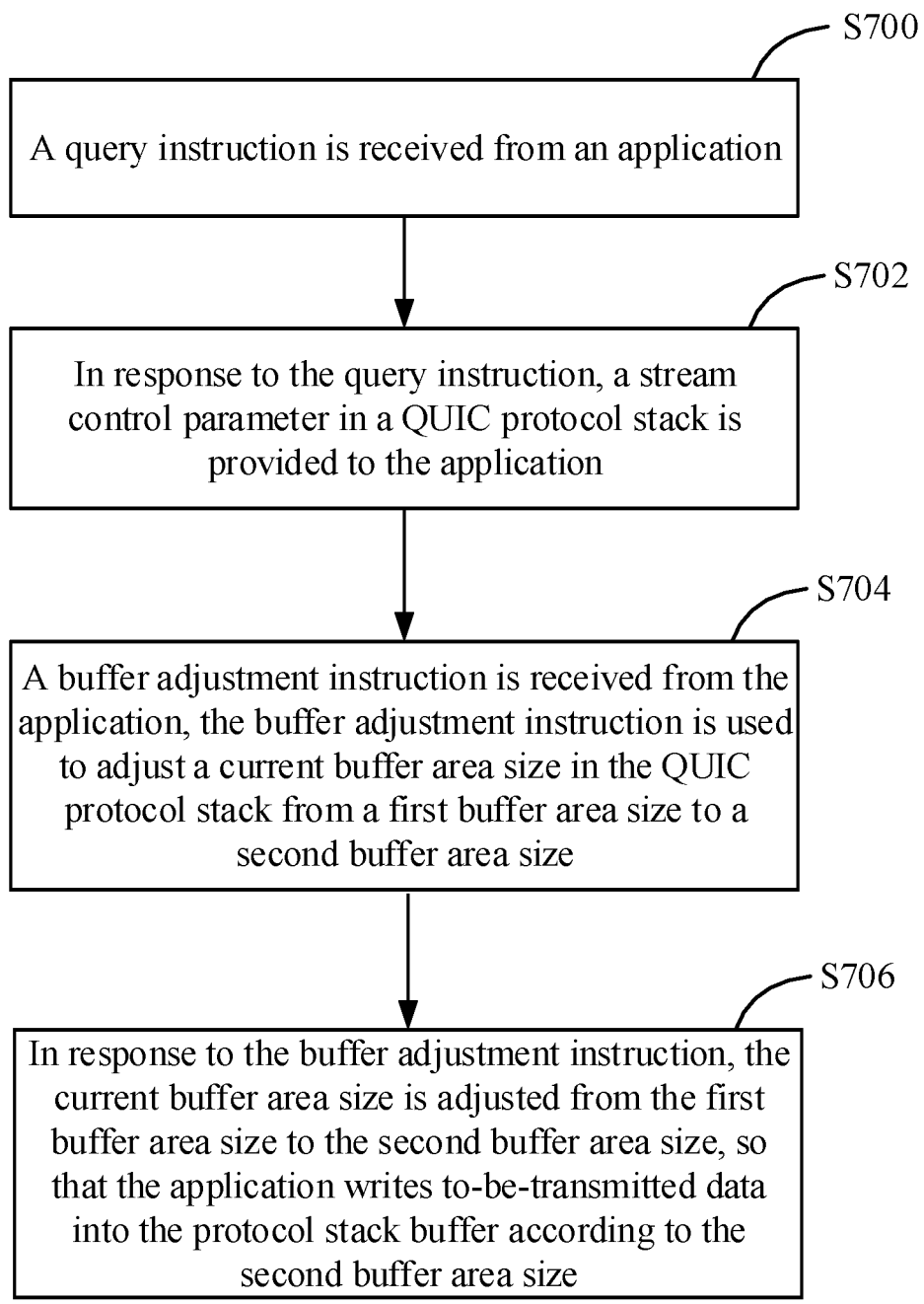
FIG. 10 is a flowchart of a data writing method according to a fourth embodiment of the present application.

FIG. 10 is a flowchart of a data writing method according to a fourth embodiment of the present application. The data writing method may include steps S700 to S710.

Step S700, a query instruction is received from an application.

The application is located in the application layer. The query instruction is an instruction that the application calls a specified an API of the transport layer, and is configured to request the transport layer to feedback a specified stream control parameters to the application.

Step S702, in response to the query instruction, a stream control parameter in the QUIC protocol stack is provided to the application.

The stream control parameter includes a congestion window size of a data receiving terminal.

Step S704, a buffer adjustment instruction is received from the application. The buffer adjustment instruction is used to adjust a current buffer area size in the QUIC protocol stack from a first buffer area size to a second buffer area size.

The QUIC protocol stack of the protocol stack buffer may be a queue, a stack, a Sudoku or the like.

The second buffer area size is calculated based on the stream control parameter and a predetermined threshold value, the predetermined threshold value is a predetermined ratio between a size of an empty area of the protocol stack buffer and the stream control parameter. Exemplarily, the second buffer area size is equal to or greater than a product value, the product value is calculated by multiplying the congestion window size by the predetermined threshold value. The first buffer area size may be greater than, equal to or smaller than the second buffer area size.

Step S706, in response to the buffer adjustment instruction, the current buffer area size is adjusted from the first buffer area size to the second buffer area size, so that the application writes to-be-transmitted data into the protocol stack buffer according to the second buffer area size.

In an exemplary embodiment, the method further includes the step of: providing a size of a non-empty area of the protocol stack buffer to the application, so that the application determines whether the to-be-transmitted data are able to be written into the protocol stack buffer according to the second buffer area size, the size of the non-empty area and a data block size of the to-be-transmitted data. The non-empty area is equal to a size of an area where data has been stored.

In an exemplary embodiment, the method further includes a step of updating the size of the non-empty area: receiving a confirmation from the data receiving terminal; and deleting the to-be-transmitted data corresponding to the confirmation in the protocol stack buffer and updating the size of the non-empty area.

Embodiment 5

Figure 11:
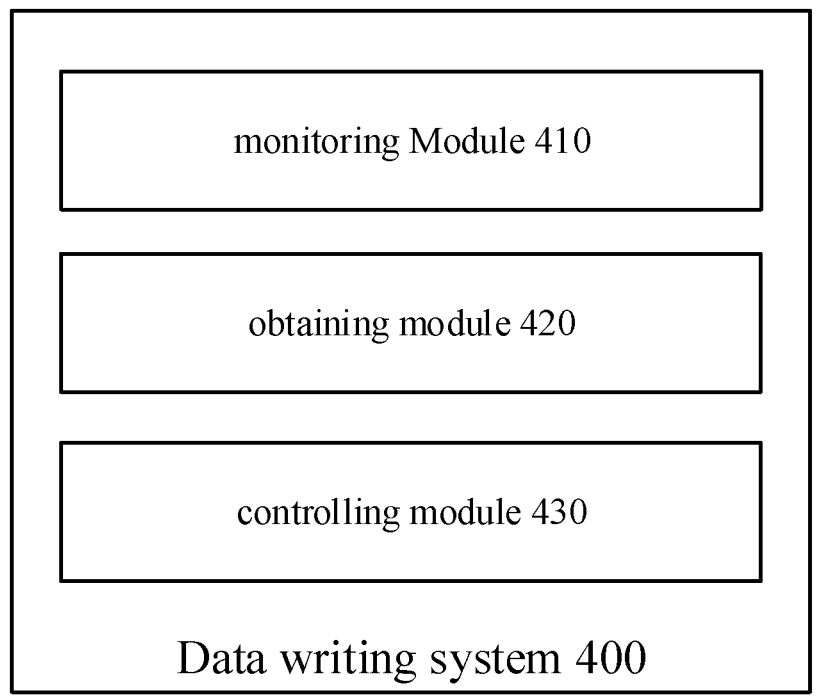
FIG. 11 is a block diagram of program modules of a data writing system according to a fifth embodiment of the present application.

FIG. 11 is a block diagram of program modules of a data writing system according to a fifth embodiment of the present application. The data writing system may be partitioned into one or more program modules which are stored in a storage medium and executed by one or more processors to complete the embodiments of the present application. The program module in the embodiment of the present application refers to a series of computer program instruction segments capable of performing specific functions and is more suitable for describing execution process of the data writing system in the storage medium than the program itself. The following specifically describes functions of the program modules in the embodiment.

As shown in FIG. 11, the data writing system 400 may include a monitoring module 410, an obtaining module 420 and a controlling module 430, wherein:

The monitoring module 410 is configured to determine whether to-be-transmitted data are detected.

The obtaining module 420 is configured to acquire a stream control parameter when the to-be-transmitted data are detected.

The controlling module 430 is configured to control to write the to-be-transmitted data into a protocol stack buffer based on the stream control parameter and a predetermined threshold value, wherein the predetermined threshold value is a predetermined ratio between a size of an empty area of the protocol stack buffer and the stream control parameter.

In an exemplary embodiment, the stream control parameter comprises a congestion window size of a data receiving terminal.

In an exemplary embodiment, the obtaining module 420 is further configured to obtain the congestion window size from a protocol stack, wherein the congestion window size is updated, according to a stream data frame from the data receiving terminal, and stored in the protocol stack.

In an exemplary embodiment, the controlling module 430 is further configured to determine whether the to-be-transmitted data are able to be written into the protocol stack buffer according to the congestion window size and the predetermined threshold value; wherein, the predetermined threshold value comprises a predetermined ratio between the size of the empty area of the protocol stack buffer and the congestion window size.

The controlling module 430 is further configured to calculate an actual ratio between the size of the empty area and the congestion window size; determine that the to-be-transmitted data are able to be written into the protocol stack buffer when the actual ratio is less than the predetermined threshold value; and determine that the to-be-transmitted data are not able to be written into the protocol stack buffer when the actual ratio is not less than the predetermined threshold value.

In an exemplary embodiment, the controlling module 430 is further configured to adjust a current buffer area size of the protocol stack buffer from a first buffer area size to a second buffer area size according to the congestion window size and the predetermined threshold value; and determine whether the to-be-transmitted data are able to be written into the protocol stack buffer according to the second buffer area size.

The controlling module 430 is further configured to calculate a product value of the congestion window size and the predetermined threshold value; and adjust the current buffer area size from the first buffer area size to the second buffer area size, wherein the second buffer area size is equal to or greater than the product value.

The controlling module 430 is further configured to obtain the size of the empty area of the protocol stack buffer according to the second buffer area size and a size of a non-empty area of the protocol stack buffer, wherein the size of the non-empty area is equal to a size of an area in which data has been stored; compare the size of the empty area with a data block size of the to-be-transmitted data; when the size of the empty area is greater than the data block size of the to-be-transmitted data, determine that the to-be-transmitted data are able to be written into the protocol stack buffer; and when the size of the empty area is not greater than the data block size of the to-be-transmitted data, determine that the to-be-transmitted data are unable to be written into the protocol stack buffer.

In an exemplary embodiment, the predetermined threshold value ranges from 2 to 5.

In an exemplary embodiment, the protocol stack buffer includes a queue, a stack, or Sudoku.

Embodiment 6

Figure 12:
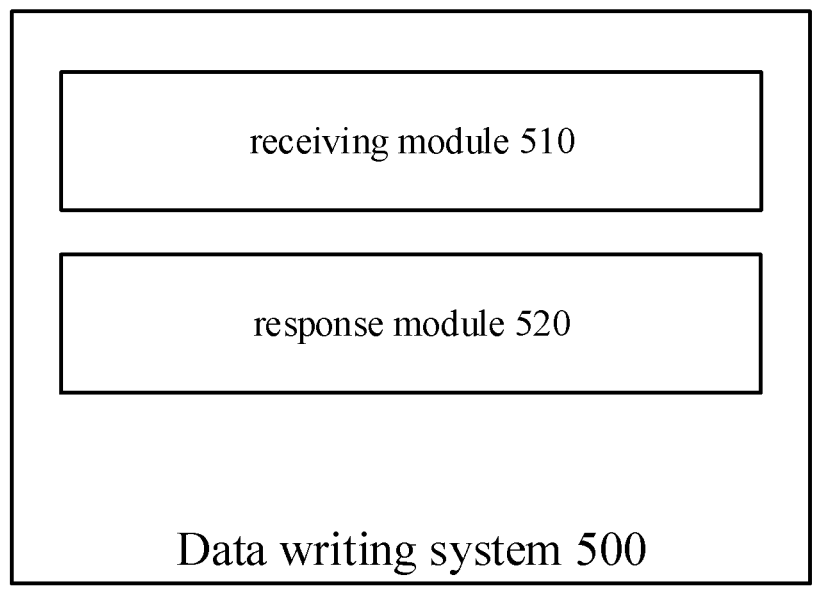
FIG. 12 is a block diagram of program modules of a data writing system according to a sixth embodiment of the present application.

FIG. 12 is a schematic diagram of a sixth embodiment of functional blocks of a data writing system. The data writing system may be partitioned into one or more program modules which are stored in a storage medium and is executed by one or more processors to complete the embodiments of the present application. The program module in the embodiment of the present application refers to a series of computer program instruction segments capable of performing a specific function and is more suitable for describing the execution process of the video processing system in the storage medium than the program itself. The following specifically describes functions of the modules in this embodiment.

As shown in FIG. 12, the data writing system 500 may include a receiving module 510 and a response module 520.

The receiving module 510 is configured to receive a query instruction from an application.

The response module 520 is configured to provide a stream control parameter of the QUIC protocol stack to the application so that the application writes to-be-transmitted data into a protocol stack buffer of the QUIC protocol stack according to the stream control parameter and a predetermined threshold value, wherein the predetermined threshold value is a predetermined ratio between a size of an empty area of the protocol stack buffer and the stream control parameter.

In an exemplary embodiment, the stream control parameter comprises a congestion window size of a data receiving terminal.

In an exemplary embodiment, the data writing further comprises an obtaining module 530, configured to receive a stream data frame from the data receiving terminal; and update the congestion window size according to the stream data frame, and storing the updated congestion window size in the QUIC protocol stack.

Embodiment 7

Figure 13:
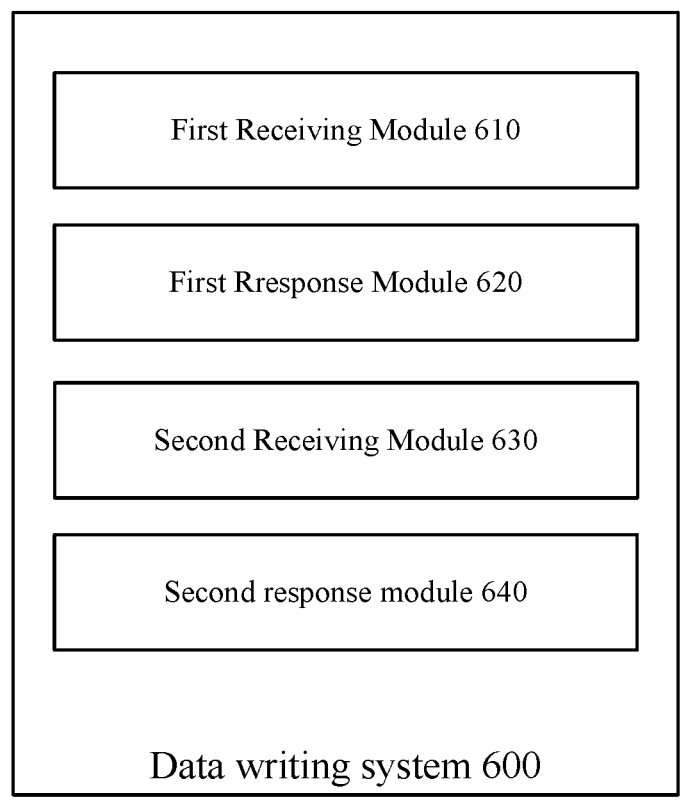
FIG. 13 is a block diagram of program modules of a data writing system according to a seventh embodiment of the present application.

FIG. 13 is a schematic diagram of a seventh embodiment of functional blocks of a data writing system. The data writing system may be partitioned into one or more program modules which are stored in a storage medium and is executed by one or more processors to complete the embodiments of the present application. The program module in the embodiment of the present application refers to a series of computer program instruction segments capable of performing a specific function, and is more suitable for describing the execution process of the video processing system in the storage medium than the program itself. The following specifically describes functions of the modules in this embodiment.

As shown in FIG. 13, the system writes the data 600 may comprise a first receiving module 610, a first response module 620, a second receiving module 630 and a second response module 640.

The first receiving module 610 is configured to receive a query instruction from an application.

The first response module 620 is configured to provide a stream control parameter in the QUIC protocol stack to the application. In an exemplary embodiment, the stream control parameter comprises a congestion window size of a data receiving terminal.

The second receiving module 630 is configured to receive a buffer adjustment instruction from the application, wherein the buffer adjustment instruction is used to adjust a current buffer area size of the QUIC protocol stack from a first buffer area size to a second buffer area size, the second buffer area size is calculated based on the stream control parameter and a predetermined threshold value, the predetermined threshold value is a predetermined ratio between a size of an empty area of a protocol stack buffer and the stream control parameter.

The second buffer area size is equal to or greater than a product value. The product value is calculated by multiplying the congestion window size by the predetermined threshold value The second response module 640 is configured to, in response to the buffer adjustment instruction, adjust the current buffer area size from the first buffer area size to the second buffer area size, so that the application writes to-be-transmitted data into the protocol stack buffer according to the second buffer area size.

In an exemplary embodiment, the second response module 640 is further configured to provide a size of a non-empty area of the protocol stack buffer to the application, so that the application determines whether the to-be-transmitted data are able to be written into the protocol stack buffer according to the second buffer area size, the size of the non-empty area and a data block size of the to-be-transmitted data. The non-empty area is equal to the size of the area in which data has been stored.

In an exemplary embodiment, the data writing system further comprises a buffer information updating module (not shown), which is configured to receive a confirmation from the data receiving terminal, and delete to-be-transmitted data corresponding to the confirmation in the protocol stack buffer and update the size of the non-empty area e.

In an exemplary embodiment, the protocol stack buffer includes a queue, a stack, or Sudoku.

Embodiment 8

Figure 14:
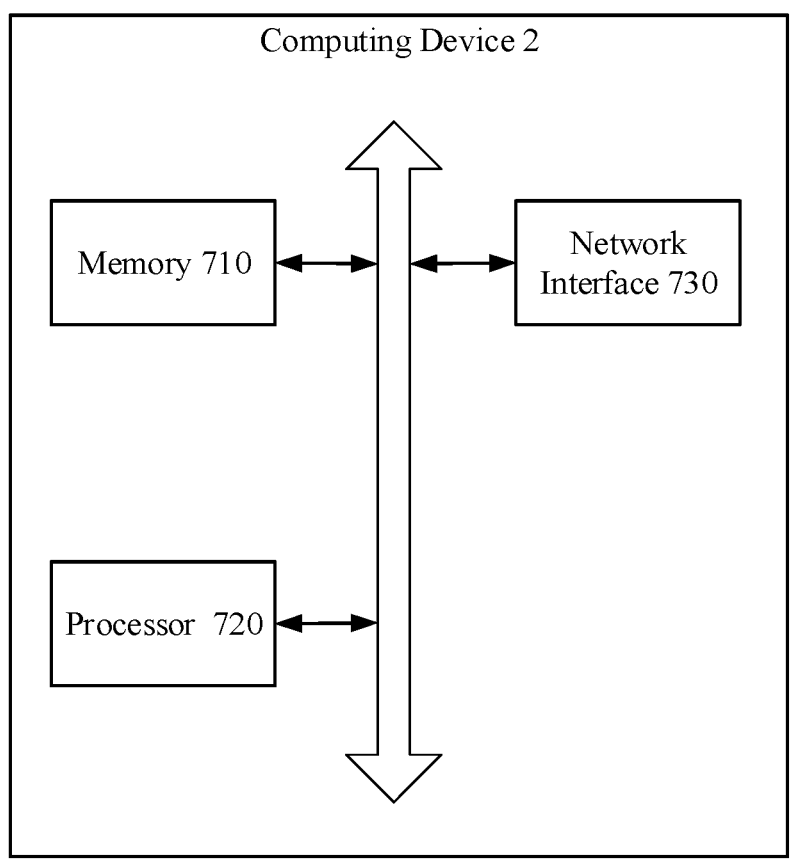
FIG. 14 is a diagram of hardware architecture of a computing device implementing a data writing method according to an eighth embodiment of the present application.

FIG. 14 is a diagram of hardware architecture of a computing device implementing a data writing method according to an eighth embodiment of the present application. In the present embodiment, the computing device 2 is a device capable of automatically performing numerical calculation and/or information processing in accordance with an instruction set or stored in advance. For example, the computing device 2 can be a smartphone, a tablet, a laptop, a desktop computer, a rack server, a blade server, a tower server, or a rack server (including a stand-alone server or a server cluster composed of multiple servers), and so on. As shown in FIG. 14, the computing device 2 includes at least, but not limited to, a memory 710, a processor 720 and a network interface 730 that can communicate with each other through a system bus.

The memory 710 includes at least one type of computer-readable storage medium including a flash memory, a hard disk, a multimedia card, a card type memory (e.g. SD or DX memory, etc.), a random access memory (RAM), a static random access memory (SRAM), a read-only memory (ROM), electrically erasable programmable read-only memory (EEPROM), programmable read-only memory (PROM), magnetic memory, magnetic disk, optical disk and the like. In some embodiments, the memory 710 may be an internal memory module of the computing device 2, for example, the hard disk or memory of the computing device 2. In other embodiments, the memory 710 may be an external storage device of the computing device 2, for example, a plug-in hard disk, a smart media card (SMC), a secure digital (SD) card, a flashcard and so on equipped in the computing device 2. Of course, the memory 710 may also include both an internal storage module of the computing device 2 and an external storage device thereof. In this embodiment, the memory 710 is generally used to store an operating system and various types of application software installed in the computing device 2, such as program codes of a data writing method or of a data writing method based on a QUIC protocol stack. In addition, the memory 710 can also be used to temporarily store various types of data that have been output or will be output.

The processor 720 may be, in some embodiments, a Central Processing Unit (CPU), a controller, a microcontroller, a microprocessor or other data processing chips. The processor 720 is typically used to control the overall operation of the computing device 2, such as performing control and processing associated with data interaction or communication with the computing device 2. In this embodiment, the processor 720 is configured to run program codes or process data stored in the memory 710.

The network interface 730 may include a wireless network interface or a wired network interface. The network interface 730 is typically used to create communication links between the computing device 2 and other computing devices. For example, the network interface 730 connects the computing device 2 to an external terminal through a network, and establishing a data transmission channel, a communication link and the like between the computing device 2 and the external terminal. The network may be an Intranet, an Internet, a global system of mobile communication (GSM), a Wideband Code Division Multiple Access (WCDMA), a 4G network, a 5G network, a Bluetooth, Wi-Fi or a wireless or wired network.

It is noted that in FIG. 14 only shows a computing device equipped with components 710-730. It should be known that it is unnecessary to implement all of the illustrated components and that more or fewer components may be required.

In the embodiment, the data writing method stored in the memory 710 can also be divided into one or more program modules and executed by one or more processors (the processor 720 in this embodiment) to complete this present application.

Embodiment 9

The present embodiment further provides a computer-readable storage medium, in which stores a computer program, executed by the processor to implement the steps of the data writing method or the data writing method based on the QUIC protocol stack.

In this embodiment, the computer-readable storage medium includes a flash memory, a hard disk, a multimedia card, a card type memory (for example, SD or DX memory, etc.), a random access memory (RAM), a static random access memory (SRAM), and a read-only memory (ROM), an electrically erasable programmable read-only memory (EEPROM), a programmable read-only memory (PROM), a magnetic memory, a magnetic disk, an optical disk, and the like. In some embodiments, a computer-readable storage medium may be an internal storage unit of a computing device, such as a hard disk or memory of the computing device. In other embodiments, a computer-readable storage medium may be an external storage device of the computing device, such as a computing device, for example, a plug-in hard disk, a smart media card (SMC), a secure digital (SD) card, a flashcard and so on equipped in the computing device. Of course, the memory 710 may also include both an internal storage module of the computing device 2 and an external storage device thereof. In this embodiment, the memory 710 is generally used to store an operating system installed in the computing device 2 and various types of application software, such as a data writing method or program codes of a data writing method based on a QUIC protocol stack. In addition, the memory 710 can also be used to temporarily store various types of data that have been output or are to be output.

Obviously, those skilled in the art should understand that the above each module or each step of the embodiments of the present application can be implemented by a general computing device, and that the modules or steps can be merged in a single computing device or distributed on a network consisting of a plurality of computing devices, alternatively, the above modules or steps may be implemented by program codes executable by the computing device such that they may be stored in the storage device to be executed by the computing device, and in some cases, the above steps may be performed in different orders, or the modules or steps are formed into integrated circuit modules, or several of the modules or steps are formed into integrated circuit modules. Thus, embodiments of the invention are not limited to any specific combination of hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of writing data into a buffer of a protocol stack, comprising:
   determining whether to-be-transmitted data are detected;
   acquiring a stream control parameter from the protocol stack of a computing device in response to a determination that the to-be-transmitted data are detected;
   determining whether the to-be-transmitted data are able to be written into the buffer of the protocol stack based on the stream control parameter and a predetermined threshold value, wherein the stream control parameter is associated with a capability of receiving data by a data receiving terminal, and the predetermined threshold value is a predetermined ratio of a size of an empty area of the buffer of the protocol stack to the stream control parameter.

2. The method of claim 1, wherein the stream control parameter comprises a size of a congestion window associated with the data receiving terminal.

3. The method of claim 2, further comprising:
   receiving a stream data frame from the data receiving terminal;
   updating the size of the congestion window based on the stream data frame; and
   storing the updated size of the congestion window in the protocol stack.

4. The method of claim 2, further comprising:
   determining an actual ratio of the size of the empty area of the buffer of the protocol stack to the size of the congestion window;
   determining that the to-be-transmitted data are able to be written into the buffer of the protocol stack in response to a determination that the actual ratio is less than the predetermined threshold value; and
   determining that the to-be-transmitted data are not able to be written into the buffer of the protocol stack in response to a determination that the actual ratio is not less than the predetermined threshold value.

5. The method of claim 2, further comprising:
   adjusting the size of the buffer of the protocol stack from a first size to a second size based on the size of the congestion window and the predetermined threshold value; and
   determining whether the to-be-transmitted data are able to be written into the buffer of the protocol stack based on the second size.

6. The method of claim 5, further comprising:
   calculating a product value of the size of the congestion window and the predetermined threshold value; and
   wherein the second size is equal to or greater than the product value.

7. The method of claim 5, further comprising:
   determining the size of the empty area of the buffer of the protocol stack based on the second size of the buffer and a size of a non-empty area of the buffer of the protocol stack, wherein the size of the non-empty area is equal to a size of an area in which data has been stored;
   comparing the size of the empty area with a data block size of the to-be-transmitted data; determining that the to-be-transmitted data are able to be written into the buffer of the protocol stack in response to a determination that the size of the empty area is greater than the data block size of the to-be-transmitted data; and
   determining that the to-be-transmitted data are unable to be written into the buffer of the protocol stack in response to a determination that the size of the empty area is not greater than the data block size of the to-be-transmitted data.

8. The method of claim 1, wherein the predetermined threshold value ranges from 2 to 5.

9. A computing device of writing data into a buffer of a protocol stack, comprising:
   at least one processor; and
   at least one memory communicatively coupled to the at least one processor and storing instructions that upon execution by the at least one processor cause the computing device to:
   determine whether to-be-transmitted data are detected;
   acquire a stream control parameter from the protocol stack in response to a determination that the to-be-transmitted data are detected;
   determine whether the to-be-transmitted data are able to be written into the buffer of the protocol stack based on the stream control parameter and a predetermined threshold value, wherein the stream control parameter is associated with a capability of receiving data by a data receiving terminal, and the predetermined threshold value is a predetermined ratio of a size of an empty area of the buffer of the protocol stack to the stream control parameter.

10. The method of claim 1, wherein the protocol stack is a Quick UDP Internet Connections (QUIC) protocol stack.

11. A method of writing data based on a Quick UDP Internet Connections (QUIC) protocol stack, comprising:
    receiving a query instruction from an application;
    in response to the query instruction, providing a stream control parameter in the QUIC protocol stack to the application, wherein the stream control parameter is associated with a capability of receiving data by a data receiving terminal;
    receiving a buffer adjustment instruction from the application;
    in response to the buffer adjustment instruction, adjusting a size of a buffer of the QUIC protocol stack from the first size to the second size, wherein the second size is determined based on the stream control parameter and a predetermined threshold value, and the predetermined threshold value is a predetermined ratio of a size of an empty area of the buffer of the QUIC protocol stack to the stream control parameter; and
    determining whether the application writes to-be-transmitted data into the buffer of the QUIC protocol stack based on the second size.

12. The method of claim 11, wherein the stream control parameter comprises a size of a congestion window corresponding to a data receiving terminal.

13. The method of claim 11, further comprising:
    determining whether the to-be-transmitted data are able to be written into the buffer of the QUIC protocol stack based on the second size, a size of a non-empty area of the buffer, and a data block size of the to-be-transmitted data.

14. The method based of claim 11, further comprising:
    receiving a confirmation of data being received by the data receiving terminal; and
    deleting the data corresponding to the confirmation from the buffer of the QUIC protocol stack; and
    updating the size of the non-empty area of the buffer.

15. The computing device of claim 9, wherein the stream control parameter comprises a size of a congestion window associated with the data receiving terminal.

16. The computing device of claim 15, wherein the at least one memory further stores instructions that upon execution by the at least one processor cause the computing device to:
receive a stream data frame from the data receiving terminal;
update the size of the congestion window based on the stream data frame; and
store the updated size of the congestion window in the protocol stack.

17. The computing device of claim 15, wherein the at least one memory further stores instructions that upon execution by the at least one processor cause the computing device to:
determine an actual ratio of the size of the empty area of the buffer of the protocol stack and the size of the congestion window; and
determine that the to-be-transmitted data are able to be written-into the buffer of the protocol stack in response to a determination that the actual ratio is less than the predetermined threshold value.

18. The computing device of claim 15, wherein the at least one memory further stores instructions that upon execution by the at least one processor cause the computing device to:
adjust the size of the buffer of the protocol stack from a first size to a second size based on the size of the congestion window and the predetermined threshold value, wherein the second size is equal to or greater than a product of the size of the congestion window and the predetermined threshold value; and
determine whether the to-be-transmitted data are able to be written into the buffer of the protocol stack based on the second size.

19. The computing device of claim 18, wherein the at least one memory further stores instructions that upon execution by the at least one processor cause the computing device to:
determine the size of the empty area based on the second size and a size of a non-empty area of the buffer of the protocol stack, wherein the size of the non-empty area is equal to a size of an area in which data has been stored;
determine that the to-be-transmitted data are able to be written into the buffer of the protocol stack in response to a determination that the size of the empty area is greater than a data block size of the to-be-transmitted data.

20. The computing device of claim 9, wherein the predetermined threshold value ranges from 2 to 5.

* * * * *